United States Patent
Ogunwumi et al.

(10) Patent No.: US 7,713,897 B2
(45) Date of Patent: May 11, 2010

(54) CERAMIC MATERIALS FOR 4-WAY AND $NO_x$ ADSORBER AND METHOD FOR MAKING SAME

(75) Inventors: Steven Bolaji Ogunwumi, Painted Post, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 403 days.

(21) Appl. No.: 11/711,336

(22) Filed: Feb. 27, 2007

(65) Prior Publication Data

US 2008/0203627 A1     Aug. 28, 2008

(51) Int. Cl.
C04B 35/00 (2006.01)
C04B 35/48 (2006.01)
B01D 39/06 (2006.01)
B01D 39/20 (2006.01)
B01D 39/14 (2006.01)

(52) U.S. Cl. .................. 501/134; 501/136; 501/105; 501/127; 55/523; 55/524

(58) Field of Classification Search .................. 501/134, 501/135, 136, 105, 127, 153; 55/523, 524
See application file for complete search history.

(56) References Cited

U.S. PATENT DOCUMENTS

| | | | |
|---|---|---|---|
| 3,549,400 A | 12/1970 | Lachman | 106/59 |
| 3,578,471 A | 5/1971 | Lachman | 106/39 |
| 4,327,188 A * | 4/1982 | Endo et al. | 501/134 |
| 4,483,944 A | 11/1984 | Day et al. | 502/439 |
| 4,758,542 A * | 7/1988 | Parker | 501/134 |
| 5,491,116 A | 2/1996 | Beall et al. | 501/5 |
| 6,677,272 B2 * | 1/2004 | Beall et al. | 502/439 |
| 6,897,182 B2 | 5/2005 | Cutler et al. | 502/302 |
| 7,259,120 B2 | 8/2007 | Ellison et al. | 501/134 |
| 2003/0211369 A1 | 11/2003 | Riman et al. | 428/702 |
| 2003/0216254 A1 | 11/2003 | Takeshima et al. | 502/304 |
| 2006/0021309 A1 * | 2/2006 | Merkel | 55/523 |
| 2007/0006561 A1 | 1/2007 | Brady et al. | 55/523 |

\* cited by examiner

*Primary Examiner*—Jerry Lorengo
*Assistant Examiner*—Noah S Wiese
(74) *Attorney, Agent, or Firm*—Joseph M. Homa

(57) ABSTRACT

Disclosed are ceramic articles comprising a sintered phase ceramic composition containing, as expressed on a weight percent oxide basis: $a(Al_2TiO_5)+b(ZrTiO_4)+c(Y_2O_3)+d(YPO_4)$ wherein "a, b, c, and d" represent weight fractions of each component such that $(a+b+c+d)=1.00$ and wherein $0.5<a\leq0.95$; $0\leq b\leq0.5$, $0.0\leq c\leq0.10$, and $0\leq d\leq0.5$. Also disclosed are precursor batch compositions and methods for manufacturing the ceramic articles disclosed herein.

15 Claims, 4 Drawing Sheets

CERAMIC MATERIALS FOR 4-WAY AND NO$_x$ ADSORBER AND METHOD FOR MAKING SAME

BACKGROUND OF THE INVENTION

1. Field of the Invention

The present invention relates to ceramic articles, and more particularly to ceramic articles having properties suitable for use in exhaust after-treatment applications, particularly diesel exhaust filtration.

2. Technical Background

Recently, much interest has been directed towards the diesel engine due to its efficiency, durability, and economical aspects. However, diesel emissions have been scrutinized both in the United States and Europe. As such, stricter environmental regulations will require diesel engines to be held to the similar standards as gasoline engines. Therefore, diesel engine manufacturers and emission-control companies are working to achieve a diesel engine which is efficient, cleaner and meets the most stringent of requirements under all operating conditions with minimal cost to the consumer.

Tighter regulations continue to drive the improvement of after-treatment technologies for the abatement of diesel emissions. A 4-way emission reduction system (which simultaneously control HC, NOx, CO and PM emissions) is the future technology desired by many original equipment manufacturers. Current 4-way emission reduction technology propose use of a NOx adsorber (storage) material coated on a fine porous ceramic filter. In use, the engine cycles between rich and lean operation modes. During lean engine operation, particulate matter is oxidized by active oxygen released from the NOx adsorbers and excess oxygen from the exhaust. During the rich mode, NOx is reduced while particulate matter is also oxidized by active oxygen released during the adsorbed NOx reduction.

Cordierite is presently being proposed as a porous substrate material for NOx adsorbing emission reduction systems, however its use has been limited to only barium-based NOx adsorbing catalyst formulations. However, NOx slippage with barium-based applications is a concern, as such slippage may occur during uncontrolled exotherms exceeding 600° C. In contrast, NOx adsorber based upon a potassium (K) catalyst would be highly desired by engine manufacturers because it may offer a broader and higher operable temperature window for NOx reduction activity. Additionally, potassium (K) is also preferable as it is not regulated as toxic heavy metal that is detrimental to the environment and human health.

However, cordierite, a primary ceramic material for present after treatment systems, contains silicate phases that are prone to react with potassium-based NOx adsorber washcoats used in diesel particulate NOx reduction (DPNR) systems. To this end, silicates within current cordierite ceramic substrate technology have been shown to leach and react with potassium based catalysts to form potassium silicate. This leaching reaction compromises both the durability of the cordierite filter substrate and NOx absorption function of the potassium washcoat. For this reason, cordierite is considered to be incompatible with a potassium-based DPNR system. Further, although operating temperatures of current DPNR systems are typically below 800° C. due to the presence of the catalyst, the low heat capacity of cordierite can present additional concerns. In particular, current DPNR systems typically require a ceramic support substrate having a porosity of at least 50%. This relatively high porosity reduces the heat capacity of the cordierite substrate and decreases thermal mass, thereby increasing the likelihood of a possible temperature excursion leading to a failure during use.

Accordingly, there is a need in the exhaust after treatment art for a durable potassium-resistant ceramic article having excellent thermal shock resistance, high heat capacity, and refractory character, that is suitable for use as a catalyst support substrate in diesel exhaust gas treatment and, in particular, in 4-way and NOx diesel exhausts treatment applications.

SUMMARY OF THE INVENTION

The present invention relates to ceramic articles, and more particularly to ceramic articles having properties suitable for use in systems employing 4-way and NOx adsorber technologies, such as in exhaust after treatment applications. The ceramic articles can be formed of a porous non-silicate ceramic oxide capable of supporting a catalyst formulation.

In one aspect, a ceramic article according to the present invention comprises a sintered phase ceramic composition containing, as expressed on a weight percent oxide basis: $a(Al_2TiO_5)+b(ZrTiO_4)+c(Y_2O_3)+d(YPO_4)$ wherein a, b, c, and d are weight fractions of each component such that $(a+b+c+d)=1.00$ and wherein $0.5<a\leq0.95$; $0\leq b\leq0.5$, $0.0\leq c\leq0.10$, and $0\leq d\leq0.5$. The ceramic articles can further comprise an alkali-based or alkaline earth-based catalyst formulation, including for example, a potassium-based catalyst formulation. The absence of silica in the ceramic article can, in one aspect, enable the ceramic articles to be resistant to potassium migration. In still another aspect, the ceramic articles of the present invention exhibit relatively high heat capacity with relatively low coefficients of thermal expansion. When catalyzed, the resulting ceramic body remains durable; maintaining its low CTE and high thermal shock resistance.

The present invention also provides a method for producing the ceramic articles disclosed herein. The method generally comprises the steps of providing a plasticized ceramic precursor batch composition comprising: an inorganic batch composition containing an alumina source, a titania source, and at least one of zirconia source, a yttria source, a phosphate source, and a yttrium phosphate source, and an optional yttrium oxide sintering aid. The plasticized ceramic precursor batch composition further comprises an organic binder; and a liquid vehicle. An extruded green body can be formed from the plasticized ceramic precursor batch composition and fired under conditions effective to convert the ceramic precursor composition into a sintered phase ceramic composition.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
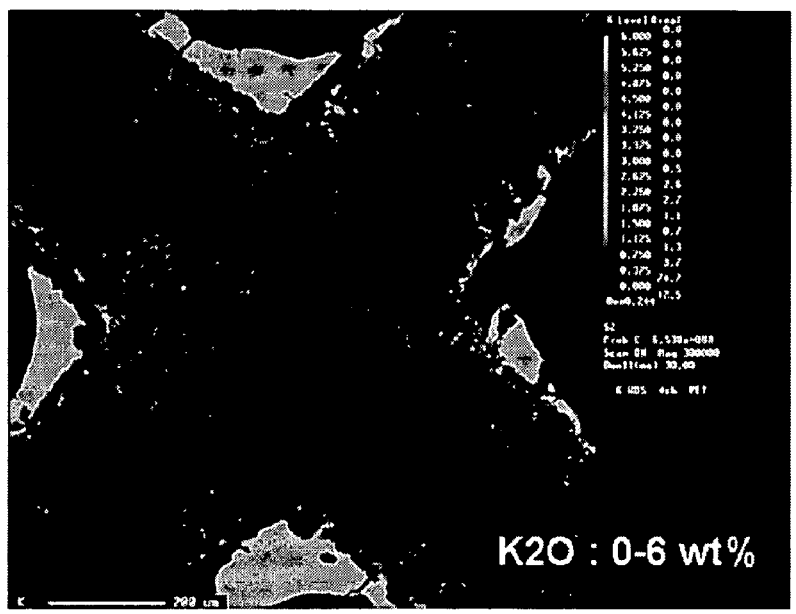
FIG. 1 depicts an electron microprobe result of a potassium washcoat on a ceramic article comprising 80% AT/20% ZT and after aging at 850° C. for 10 hours in 10% steam.

The present invention can be understood more readily by reference to the following detailed description, examples, and claims, and their previous and following description. However, before the present compositions, devices, and/or methods are disclosed and described, it is to be understood that this invention is not limited to the specific articles, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "alumina source" includes aspects having two or more such alumina sources unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, a "weight percent" or "percent by weight" of a component, unless specifically stated to the contrary, is based on the total weight of the formulation or composition in which the component is included.

As briefly introduced above, the present invention provides an improved ceramic articles useful for high temperature ceramic filter applications. In one aspect, the ceramic articles are suitable for use as a "4-Way" diesel particular filter (DPF) capable of reducing one or more of Hydrocarbons (HC), Carbon Monoxide (CO), Nitrogen Oxides (NOx), and Particulate Matter (PM) from a stream of diesel exhaust gas. To that end, the ceramic article is comprised of a sintered phase ceramic oxide composition containing, as expressed on a weight percent oxide basis: $a(Al_2TiO_5)+b(ZrTiO_4)+c(Y_2O_3)+d(YPO_4)$; wherein a, b, c, and d are weight fractions of each component such that $(a+b+c+d)=1.00$; and wherein $0.5<a\leq0.95$; $0\leq b\leq0.5$, $0.0\leq c\leq0.10$, and $0\leq d\leq0.5$.

As indicated, the sintered phase ceramic oxide composition comprises aluminum titanate ($Al_2TiO_5$) in an amount "a", expressed on a weight percent oxide basis as a weight fraction of the oxide components, wherein $0.5<a\leq0.95$. Thus, it should be understood that the weight fraction "a" of aluminum titanate can be any value within the stated range, including for example, 0.6, 0.7, 0.8 and 0.9. Still further, the weight fraction "a" of aluminum titanate can also be within any range of values derived therefrom, including for example $0.6<a\leq0.8$.

The ceramic oxide composition can optionally comprise zirconium titanate ($ZrTiO_4$) in an amount "b", expressed on a weight percent oxide basis as a weight fraction of the oxide components, wherein $0\leq b\leq0.5$. Thus, it should be understood that the weight fraction "b" of zirconium titanate can be any value within the stated range, including for example, 0.1, 0.2, 0.3 and 0.4. Still further, the weight fraction "b" of zirconium titanate can also be within any range of values derived therefrom, including for example $0.20\leq b\leq0.40$.

The ceramic oxide composition can also optionally comprise yttrium oxide ($Y_2O_3$). When present, the yttrium oxide can in one aspect be utilized as a sintering aid during manufacture of the sintered phase composition. To that end, as summarized above, the yttrium oxide is optionally present in an amount "c", expressed on a weight percent oxide basis as a weight fraction of the oxide components, wherein $0.0\leq c\leq0.10$. Thus, it should be understood that the weight fraction "c" of yttrium oxide can be any value within the stated range, including for example, 0.01, 0.03, 0.05, 0.07, and 0.09. Still further, the weight fraction "c" of yttrium oxide can also be within any range of values derived therefrom, including for example $0.0\leq c\leq0.05$.

Still further, the ceramic oxide composition further optionally comprises yttrium phosphate ($YPO_4$ and also known as xenotime) in an amount "d", expressed on a weight percent oxide basis as a weight fraction of the oxide components, wherein $0\leq d\leq0.5$. Thus, it should be understood that the weight fraction "d" of yttrium phosphate can be any value within the stated range, including for example, 0.05, 0.15, 0.25, 0.35, and 0.45. Still further, the weight fraction "d" of yttrium phosphate can also be within any range of values derived therefrom, including for example $0.05\leq d\leq0.5$.

The ceramic oxide composition can comprise aluminum titanate together with any one or more of the zirconium titanate, yttrium oxide, and yttrium phosphate. For example, in an exemplary aspect, the sintered phase ceramic oxide composition can consist essentially of aluminum titanate, zirconium titanate, and yttrium oxide, wherein the respective weight fractions of the aluminum titanate, zirconium titanate, and yttrium oxide are: $0.60 \leq a \leq 0.80$ and $0.20 \leq b \leq 0.40$ and $0.00 \leq c \leq 0.05$. In still another exemplary aspect, the sintered phase ceramic oxide composition can consist essentially of aluminum titanate and yttrium phosphate, wherein the respective weight fractions of the aluminum titanate and the yttrium phosphate are: $0.5 \leq a \leq 0.95$ and $0.05 \leq d \leq 0.5$.

The sintered phase ceramic oxide composition can further be characterized by its total porosity in %, as measured by mercury porosimetry, as being relatively high. In one aspect, the total porosity of the ceramic oxide composition is at least 40%. In another aspect, the total porosity % can be at least 45%, at least 50%, at least 55%, or even at least 60%. In still another aspect, the total porosity % may be in any range derived from these exemplary porosity values, including for example, in the range of from 40% to 50%, from 45% to 55%, or even from 50% to 60%.

Another advantage of the inventive ceramic article is a relatively low thermal expansion, which can result in excellent thermal shock resistance (TSR). TSR is inversely proportional to the coefficient of thermal expansion (CTE). That is, a ceramic article having relatively low thermal expansion will exhibit good thermal shock resistance and can survive the wide temperature fluctuations that are encountered in end use filter applications. Accordingly, in one aspect, the ceramic articles of the present invention are characterized by having a relatively low coefficient of thermal expansion (CTE), measured by dilatometry, in at least one direction, i.e., the axial and/or transverse direction, wherein CTE is less than or equal to $20.0 \times 10^{-7}/°C$. across the temperature range of from 25° C. to 1000° C. In another aspect, the CTE is less than or equal to $15.0 \times 10^{-7}/°C$. across the temperature range of from 25° C. to 1000° C. Still further, in another aspect, the CTE of the ceramic article is less than or equal to $12.0 \times 10^{-7}/°C$. across the temperature range of from 25° C. to 1000° C. In still another aspect, the CTE is less than or equal to $10.0 \times 10^{-7}/°C$. across the temperature range of from 25° C. to 1000° C. In another aspect, the CTE does not change appreciably after aging in 10% steam at 800° C. for 65 hours. In particular, the CTE is less than $20.0 \times 10^{-7}/°C$. after such aging in 10% steam at 800° C. for 65 hours.

The ceramic bodies of the present invention can also comprise a relatively narrow pore size distribution evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity $d_{50}$ is the median pore size based upon pore volume, and is measured in micrometers; thus, $d_{50}$ is the pore diameter at which 50% of the open porosity of the ceramic has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury.

The median pore diameter or median pore size (MPS), $d_{50}$, of the pores present in the instant ceramic articles can, in one aspect, be greater than 1 μm, greater than 5 μm, greater than 10 μm, greater than 15 μm, or even greater than 20 μm. In another aspect, the median pore diameter can be in the range of from 1 μm to 25 μm. In still another aspect, the median pored diameter can be in the range of from 5 μm to 15 μm.

The ceramic articles of the present invention can have any shape or geometry suitable for a particular application. In high temperature filtration applications, such as diesel particulate filtration, for which the inventive bodies are in one aspect especially well suited, it is preferred for the bodies to have a multicellular structure, such as that of a honeycomb monolith. An exemplary honeycomb structure can have an inlet and outlet end or face, and a multiplicity of cells extending from the inlet end to the outlet end, the cells having porous walls. The honeycomb structure can further have cellular densities from 70 cells/in² (10.9 cells/cm²) to 400 cells/in² (62 cells/cm²).

A portion of the cells at the inlet end or face end can, in one aspect, be plugged with a paste having same or similar composition to that of the honeycomb structure, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. A preferred arrangement is to have every other cell on a given face plugged as in a checkered pattern. This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as "wall flow" filters since the flow paths resulting from alternate channel plugging require the exhaust being treated to flow through the porous ceramic cell walls prior to exiting the filter.

The ceramic articles of the present invention can further comprise a catalyst washcoating applied thereon. As one of ordinary skill in the art will appreciate, the particular catalyst washcoating desired will be dependent upon the particular species to be adsorbed and/or filtered from an exhaust stream. However, in an exemplary aspect wherein the ceramic article is for adsorbing and reducing one or more of Hydrocarbon (HC), Carbon Monoxide (CO), Nitrogen Oxides (NOx), and Particulate Matter (PM) from a stream of diesel exhaust gas, the catalyst washcoating can comprise an alkali metal or alkali earth metal catalyst, including for example, barium, strontium, and/or potassium.

The present invention also provides a method for manufacturing ceramic articles as described herein. Any high temperature ceramic processing methods such as reaction-sintering or melting of inorganic batch precursors can be used. In one aspect, the method according to the present invention generally comprises the steps of first providing a plasticized ceramic precursor batch composition comprising an inorganic ceramic forming batch composition; an organic binder; and a liquid vehicle. An extruded green body can then be formed from the plasticized ceramic precursor batch composition. Once formed, the extruded green body can be fired under conditions effective to convert the ceramic precursor composition into a sintered phase ceramic composition.

The inorganic ceramic forming batch composition comprises an alumina source and a titania source. Depending on the desired composition of the resulting sintered phase ceramic oxide composition, the inorganic ceramic forming batch composition further comprises at least one of a zirconia source, a phosphorous oxide source, a yttria source, and yttrium phosphate source, and an optional yttrium oxide sintering aid. For example, in one exemplary aspect, the inorganic ceramic forming batch composition comprises an alumina source, a titania source, and a zirconia source. In another exemplary aspect, the inorganic ceramic forming batch composition further comprises an alumina source, a titania source, and a yttrium phosphate source.

The inorganic ceramic batch components can also be naturally occurring and/or synthetically produced materials including components in the form of carbonates, phosphates, nitrates, citrates, sulfides, hydrates, oxides, and the like. Thus, it should be understood that the present invention is not limited to any particular types of powders or raw materials, as such can be selected depending on the properties desired in the final ceramic body.

Exemplary alumina sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, such as the Alcan C-700 series, having a particle size of about 4-6 micrometers, and a surface area of about 0.5-1 $m^2/g$, e.g., C-714 and C-701™. Relatively fine aluminas, having a particle size of about 0.5-2 micrometers, and a surface area of about 8-11 $m^2/g$, can also be used, such as A10 and A-16SG alumina, available from Alcoa. In still another aspect, the alumina forming source can be a colloidal alumina having particles sizes in the range of from 20 nm to 50 nm, such as the AL20 available from Nyacol.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 $m^2/g$. Alternatively, a dispersible alumina source can have a specific surface area of at least 50 $m^2/g$. In an exemplary aspect, a suitable dispersible alumina source for use in the methods of the instant invention comprises alpha aluminum oxide hydroxide ($AlOOH \cdot x H_2O$) commonly referred to as boehmite, pseudo-boehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the present invention include, without limitation, Dispal Boehmite, commercially available from CONDEA Vista Company of Houston, Tex., and Alpha Alumina A1000, commercially available from Almatis, Inc.

The titania source can in one aspect be a titanium dioxide composition, such as rutile titania, anatase titania, or a combination thereof. An exemplary commercially available titania source suitable for use in the instant invention is the Ti-pure titania, available from Dupont, Wilmington, Del., USA. Titania sources are not limited to the rutile structure. Anatase sources which are usually of finer particles sizes may also be use. When anatase is used as the source of the titania, the titania source may be spray-dry to aggregate the particles to particle size greater than 1 micron, or even 5-20 microns aggregates. Rutile titania particle range may be between 1-25 microns, or even between 10-20 microns.

The zirconia source can in one aspect be a zirconium oxide ($ZrO_2$). To that end, an exemplary commercially available zirconia source suitable for use in the instant invention is the Z19 zirconia, available from Zircoa, Inc., Solon, Ohio USA. It is preferable that the zirconia median particle size is at least 2 microns.

Yttrium phosphate ($YPO_4$) is a naturally occurring mineral, also referred to as Xenotime. A yttrium phosphate or xenotime powder can also be obtained by reacting yttrium oxide and phosphorous oxide under a variety of conditions effective to provide yttrium phosphate. In an exemplary process, a mixture of yttrium oxide and phosphorous oxide can be calcined in a platinum crucible at 190° C. for approximately 24 hours. The calcined mixture can then be reacted at an elevated temperature for another 24 hours. Following the reaction, the resulting yttrium phosphate can be ground to a desired particle size using, for example, alumina media and sieving to a desired mesh size. Optionally, the yttrium source may be yttrium oxide and the phosphate source may be phosphorous oxide.

One of ordinary skill in the art will appreciate that the amount of the above-described inorganic batch components can be selected to yield a resulting ceramic composition having the desired oxide components and desired weight fractions as described herein. To that end, the selection and/or determination of such amounts will be readily obtainable by one of ordinary skill in the art in view of the instant disclosure and without requiring undue experimentation and thus will not be discussed in detail herein. However, in exemplary aspect, the amount of aluminum titanate is estimated to be between 50-90% by weight, and in some embodiments, even between 60-80% by weight. Similarly, the secondary phase (zirconium titanate or Yttrium phosphate) is estimated to be between 10-50% by weight, and in some embodiments, between 20-40%. Traces of corundum may be observed. It one aspect, there is no titania left which is unreacted following sintering, or only a trace is left unreacted, i.e., less than 0.05 wt. %. In the absence of a sintering aid, substantial amounts of zirconia, titania, and alumina are present when fired below 1500° C.

As indicated above, the inorganic ceramic forming batch composition can further comprise a sintering aid. The addition of the sintering aid can, for example, enhance the strength of the ceramic composition after firing. Suitable sintering aids generally include an oxide source of one or more metals such as strontium, barium, iron, magnesium, zinc, calcium, aluminum, lanthanum, yttrium, titanium, bismuth, molybdenum or tungsten. In one aspect, and as described herein, it is preferred that the sintering aid comprises yttrium oxide.

The plasticized ceramic precursor batch composition can further comprise an optional pore forming agent in order to optimize the porosity and pore size distribution in the fired body for a particular application. To this end, a pore former is a fugitive material which can, for example, evaporate or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like. The pore former can be utilized in virtually any amount sufficient to achieve desired levels of porosity. For example, the plasticized ceramic precursor batch composition can comprise one or more pore formers in an amount in the range of from 0 weight percent up to 70 weight percent, including exemplary amounts of 20 weight %, 30 weight %, 40 weight % or even 50 weight %.

The inorganic batch components and any optional pore former component can be intimately blended with a liquid vehicle and forming aids which impart plastic formability and green strength to the raw materials when they are shaped into a green body. Exemplary forming aids can include, without limitation, plasticizers, surfactants, lubricants, and temporary binders.

Forming of the green body may be done by, for example, molding or extrusion. When forming is done by extrusion, most typically a cellulose ether temporary binder such as methylcellulose, hydroxypropyl methylcellulose, methylcellulose derivatives, and/or any combinations thereof, serve as a binder. Exemplary lubricants can also include a hydrocarbon oil, tall oil, oleic acid, sodium stearate, tri-ethanol amine, or any combination thereof. Still further, the liquid vehicle component can in an exemplary aspect comprise water. In another aspect, depending on the component parts of the ceramic batch composition, it should be understood that organic solvents such as, for example, methanol, ethanol, or a mixture thereof can also be used as the liquid vehicle.

The relative amounts of the forming aids can vary depending on factors such as the nature and amounts of raw materials used, etc. For example, in one aspect, the organic binder is present in as a super addition in an amount in the range of from about 2% to about 10% by weight of the plasticized composition. Similarly, the liquid vehicle component can vary depending on the type of material used in order to impart optimum handling properties and compatibility with the other components in the ceramic batch mixture. For example, in one aspect, the liquid vehicle can be present as a super addition in an amount in the range of from 15% to 60% by weight of the plasticized composition, and more preferably in the range of from 20% to 50% by weight of the plasticized composition.

Once intimately blended, the resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The instant method and the resulting ceramic structures are in one aspect especially suited for use as diesel particulate filters and, in particular, for adsorbing one or more of Hydrocarbons (HC), Carbon Monoxide (CO), Nitrogen Oxides (NOx), and Particulate Matter (PM) from a stream of combustion exhaust gas. To that end, the inventive ceramic bodies are especially suited as multi-cellular honeycomb structures having a high filter volumetric heat capacity, a low pressure drop between the entrance and exit faces of the filter, a low CTE, and high filtration efficiency. To this end, in one aspect the plasticized ceramic precursor batch composition can be formed or otherwise shaped into a honeycomb configuration.

Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon such as a square or an octagon, a circle, an ellipse, or the like.

Some examples of ceramic honeycombs produced by the process of the present invention generally comprise cell densities in the of range from 235 cells/cm$^2$ (about 1500 cells/in$^2$) to 15 cells/cm$^2$ (about 100 cells/in$^2$), including those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Further, the wall or web thicknesses typically range from about 0.07 to about 0.6 mm (about 3 to about 25 mils). It should however be understood that the particular desired size and shape of the ceramic body can depend on the application, e.g., in automotive applications by engine size and space available for mounting, etc. To this end, although the ceramic articles of the instant invention are, in one aspect, suitable for preparing thin-walled honeycombs, the claimed mixtures can also be used for thicker walled structures. For example, honeycombs structures having about 15 to about 30 cells/cm$^2$ (about 100 to about 200 cells/in$^2$) and about 0.30 to about 0.64 mm (about 12 to about 25 mil) wall thicknesses are well suited for diesel particulate filter applications.

The formed green body having a desired size and shape as described above can then be dried to remove excess moisture. The drying step can be performed by hot air, microwave, steam, or dielectric drying, which can be followed by ambient air drying. Once dried, the green body can thereafter be fired under conditions effective to convert the green body into a ceramic article comprising a primary crystalline phase ceramic composition as described below.

The firing conditions effective to convert the green body into a ceramic article can vary depending on the process conditions such as, for example, the specific composition, size of the green body, and nature of the equipment used. To that end, in one aspect the optimal firing conditions needed to obtain a ceramic article according to the instant invention will be obtainable by one of ordinary skill in the art through no more than mere routine experimentation. Thus, the present invention is not limited to specific firing temperatures and times. However, in one aspect, the firing temperatures can range from about 1400° C. to about 1600° C. In another aspect, the firing temperature can range from about 1450° C. to about 1550° C. The firing times can also range from about 1 hour to about 6 hours, including exemplary firing times of 2, 3, 4, or 5 hours.

Once the green body has been fired, a catalyst washcoating can be applied to the resulting porous ceramic article. In one aspect, the washcoating can be an alkali washcoating solution such as, for example, an alumina/barium, or alumina/potassium based washcoating solution. Unless otherwise specified, the typical potassium washcoat solution used is prepared by mixing potassium nitrate (Sigma Aldrich, St. Louis, Mo.) with gamma alumina (Grace Chemicals, Columbia, Md.) in 10/100 w/w ratio. The resulting mixture is then dried and calcined at 550° C. for three hours. The resulting powder is milled and to that a 15% weight commercially available alumina based washcoating and binder solution Nyacol® Al20 is added, Nyacol® Al20 colloidal alumina sol is commercially available from Nyacol Nano Technologies, Inc., Ashland, Mass., U.S.A. For deep bed wall flow (filter) test, the gamma alumina and Nyacol® Al20 is mixed and washcoated initially followed by introduction of the potassium nitrate solution Prior to applying the catalyst washcoating, a pre-coating or passivation step can be used to improve the properties of the catalyzed substrates, by reducing catalyst and/or support coating diffusion into the relatively fine pore and microcrack structure of the formed ceramic article. Exemplary pre-coating or passivation steps can include one or more of those disclosed and described in United States Patent Application Publication No.: 2005/0037147, the entire disclosure of which is incorporated by reference herein for all purposes.

The washcoating can be applied by any conventionally known method. For example, the washcoating process can comprise dip-coating the porous ceramic article in a washcoating solution for a period of time sufficient to achieve a substantially even coating layer. Excess coating can then be removed from the sample using, for example, compressed air. The washcoated ceramic article can also be dried to provide the resulting catalyst-coated or washcoated ceramic article.

EXAMPLES

To further illustrate the principles of the present invention, the following examples are put forth so as to provide those of ordinary skill in the art with a complete disclosure and description of how the ceramic articles and methods claimed herein can be made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric.

Examples 1-4

Four inventive sintered phase ceramic oxide compositions consisting essentially of zirconium titanate and aluminum titanate (ZT-AT), in varying relative oxide weight fractions, were prepared from the exemplary batch compositions set forth in Table 1 below.

TABLE 1

Batch Compositions for Examples 1-4

| | Batch Composition | | |
|---|---|---|---|
| | A | B | C |
| % Aluminum Titanate (AT) | 80 | 70 | 60 |
| % Zirconium Titanate (ZT) | 20 | 30 | 40 |
| | Weight % | Weight % | Weight % |
| Inorganic Batch Materials | | | |
| Zirconia (Z19 - Zircoa) | 12.12 | 18.18 | 24.17 |
| $Al_2O_3$ (A10 - Alcoa) | 44.86 | 39.25 | 33.64 |
| TiO2 (Ti-Pure - Dupont) | 43.02 | 42.57 | 42.19 |
| $Y_2O_3$ (H.C. Starck) | 3 | 3 | 3 |
| Additives and Forming Aids | | | |
| Pore Former (A625 - Asbury) | 30 | 30 | 30 |
| Methocel F241 | 4.5 | 4.5 | 4.5 |
| Emulsion* | 16 | 16 | 16 |

*An emulsion comprising 6.25% Tall oil in water with 0.94% of 97% triethanol amine As indicated, the relative weight percentages of the inorganic batch materials were varied among the three batch compositions in order to provide resulting ceramic articles having aluminum titanate and zirconium titanate in varying relative weight fractions. In particular, the batch compositions were adjusted to provide sintered phase ceramic articles having aluminum titanate weight fractions of 80%, 70% and 60% respectively. Likewise, the relative oxide weight fractions of the zirconium titanate in the resulting ceramic articles were 20%, 30% and 40% respectively.

The ceramic articles can be prepared by pre-sizing and turbula mixing the powdered materials. The batch additives and forming aids, including the liquid vehicle, organic binder, and any lubricant can be added to the resulting powder mixture and subsequently mulled together. The resulting material can then extruded, and the resulting cellular wares can be dried by, for example, a humidity controlled oven or microwave. For Examples 1-3, three two inch extruded green bodies, each comprising one of the plasticized batch composition A, B, and C, of Table 1 were fired at 1500° C. for approximately 6 hours. Example 4 was similarly prepared by firing a fourth extruded 2 inch green body, also comprising the plasticized batch composition "C" at approximately 1475° C. for approximately 6 hours. Except where noted, testing of the four resulting ceramic articles was performed on cellular wares having 200 cells per square inch and 12 mil wall thicknesses.

The four ceramic articles were then evaluated for several physical properties, including coefficient of thermal expansion, total porosity, median pore size and strength. The results of the evaluation are set forth in Table 2 below.

TABLE 2

Measured Physical properties of Examples 1-4

| | Example # | | | |
|---|---|---|---|---|
| | 1 | 2 | 3 | 4 |
| Batch Composition | A | B | C | C |
| Firing Temperature/Time | 1500° C./ 6 hr | 1500° C./ 6 hr | 1500° C./ 6 hr | 1475° C./ 6 hr |
| CTE ($\times 10^{-7}$/° C.) | 7.2 | 5.4 | 4.1 | 7.4 |
| Porosity (%) | 53 | 52 | 45 | 50 |
| MPS (μm) | 13 | 12 | 20.8 | 17 |
| Strength (psi - rods) | 503 | 788 | — | 725 |

A sample ceramic article prepared according to the procedures set forth for Example 1, comprising 80% AT/20% ZT, was subsequently evaluated for its compatibility with a potassium containing washcoat. The washcoat was applied primarily on the surface of the ceramic web in order to simulate a typical coating condition used for automotive substrates. FIG. 1 shows the electron microprobe result of the potassium washcoat on the 80% AT/20% ZT sample after aging at 850° C. for 10 hours in 10% steam. As shown, no potassium reaction or leaching was observed in the interstitial microstructure for up to 6 wt % $K_2O$ after the accelerated aging test.

Figure 2:
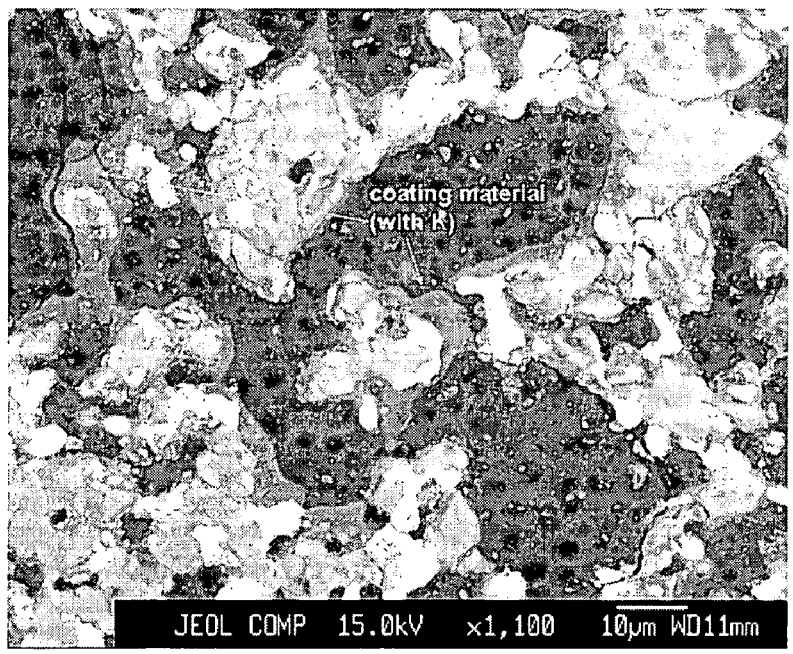
FIG. 2 depicts another example of a electron microprobe result of potassium washcoat on a ceramic article comprising 80% AT/20% ZT and after aging at 850° C. for 10 hours in 10% steam.

A second sample of a ceramic article prepared according to the procedures set forth for Example 1, comprising 80% AT/20% ZT, was again evaluated for its compatibility with a potassium containing washcoat. In this case a 0.6 M potassium washcoat was applied in the pores of the walls as would typically be the case in a 4 way adsorber application. FIG. 2 shows the electron microprobe result of the potassium washcoat on the 80% AT/20% ZT sample after aging at 850° C. for 10 hours in 10% steam environment. Again, no significant reaction was observed in the analyzed using electron microprobe upto 3.5% wt $K_2O$ after accelerated aging.

Figure 3:
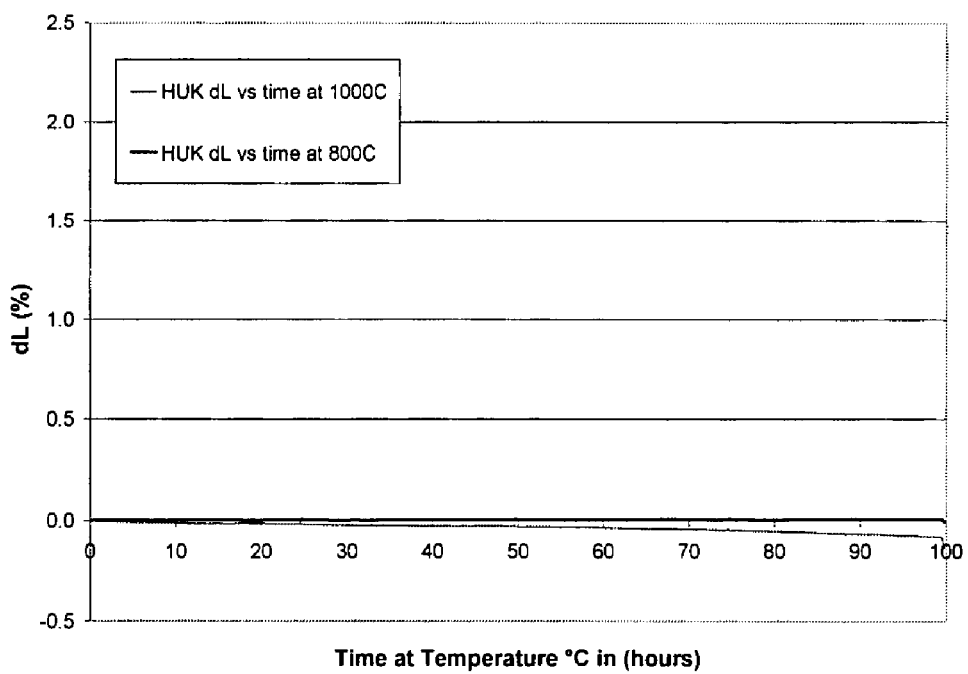
FIG. 3 is a graph illustration showing the stability of the aluminum titanate phase in the ceramic composition of the present invention.

A sample ceramic composition prepared according to Example 2, comprising 70% AT/30% ZT, was evaluated to determine the stability of the aluminum titanate phase in the inventive ceramic composition. As shown in FIG. 3, no decomposition or growth was observed after a 100 hour hold period at 800° C. Although a realtively small amount of decomposition was observed after 100 hours of testing at 1000° C., the results of this test indicate that the exemplified composition can in one aspect be used at temperatures of up to 1000° C. for limited periods without resulting decomposition or growth.

A sample prepared according to Example 2 comprising of 70% AT/30% ZT was pre-passivated with ionene according to U.S. Pat. No. 7,132,150. The inventive sample was washcoated with 0.9% weight of the potassium nitrate/gamma alumina/Al-20 washcoat slurry and aged under 10% steam at 800° C. for 15 hours. The post measured coefficient of thermal expansion up to 1000° C. decreased by 1.6 points.

Figure 4:
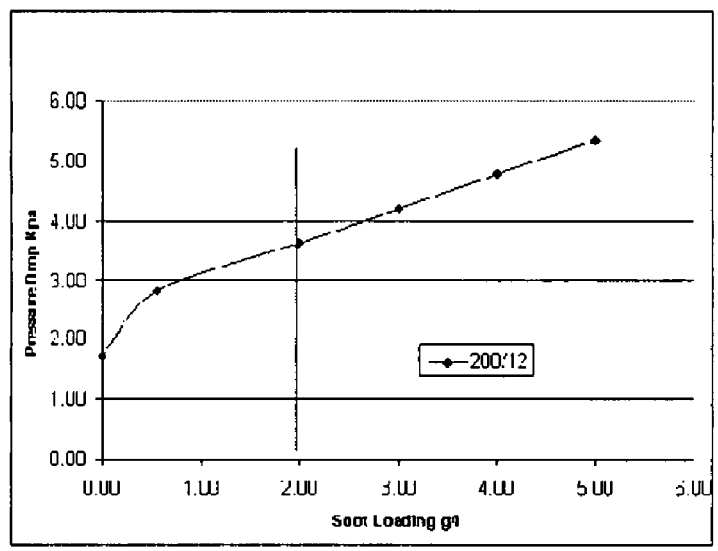
FIG. 4 illustrates an examplary pressure drop curve for an inventive ceramic compisition comprising 80% AT and 20% ZT.
Figure 5:
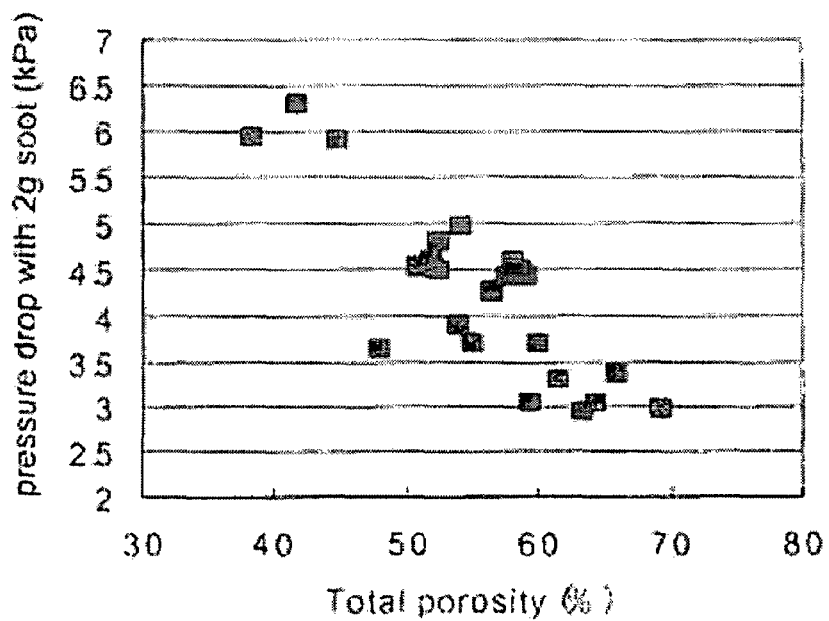
FIG. 5 is a comparison plot showing typical effects of pressure drop on total porosity in the absence of a catalysts washcoat.

A sample inventive ceramic composition prepared according to the procedures set forth for Example 1, comprising 80% AT/20% ZT, was also evaluated for its pressure drop under a range of soot loadings. FIG. 4 provides the pressure drop curve obtained for the 80% AT and 20% ZT sample. For a typical "4 way" adsorber application, the targeted soot loading per regeneration is 1-2 g/l as indicated in the plot. The data reported in FIG. 4 indicates that, when compared with targeted pressure drop values reported in FIG. 5, the pressure drop value of the inventive ceramic article at 2 g/l soot loading is comparable to that of conventional articles having 60% or higher levels of porosity.

Figure 6:
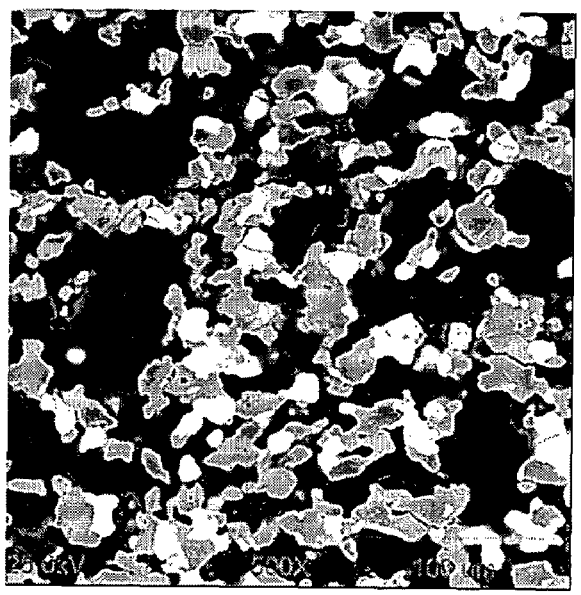
FIG. 6 is a scanning electron micrograph of an inventive ceramic composition comprisin 80% AT and 20% ZT sample.

Still further, FIG. 6 is an exemplary scanning electron micrograph of the 80% AT/20% ZT sample prepared according to Example 1. As shown, the well connected pores of the microstructures are visible with the white grains being the zirconium titanate phase and the gray being the aluminum titanate phase.

Examples 5-13

The suitability of yttrium phosphate as a non-silicate additive and strengthener for an aluminum titanate ceramic article according to the present invention was also evaluated with three extrusion batches. To that end, three inventive sintered phase ceramic oxide compositions comprising yttrium phosphate and aluminum titanate (YP-AT) were prepared from the exemplary batch compositions set forth in Table 3 below.

TABLE 3

Batch Compositions used for Examples 5-13

|  | Batch Composition | | |
|---|---|---|---|
|  | D Weight % | E Weight % | F Weight % |
| Inorganic Batch Materials | | | |
| $Al_2O_3$ (A10 - Alcoa) | 39.1 | 39.1 | 39.1 |
| $TiO_2$ - RMA | 30.7 | 30.7 | 30.7 |
| Yttrium Phosphate - A | 30.2 | — | — |
| Yttrium Phosphate - B | — | 30.2 | — |
| Yttrium Phosphate - C | — | — | 30.2 |
| Additives and Forming Aids | | | |
| Pore Former (A625 - Asbury) | 30 | 30 | 30 |
| Methocel A4M | 4.5 | 4.5 | 4.5 |
| Oleic Acid | 1.0 | 1.0 | 1.0 |
| Water | As needed | As needed | As needed |

As indicated in Table 3, the three extrusion batch compositions are equivalent except for the yttrium phosphate component. The three yttrium phosphate batch materials were prepared by first turbula mixing powders of yttrium oxide and phosphorous oxide for 1 hour, then calcining the mixture in a platinum crucible at 190° C. for 24 hours. The calcined mixtures were then reacted at an elevated temperature for 24 hours. The reaction products were then ground with alumina media and sieved to −325 mesh size. Yttrium phosphate batch code "A" was reacted at 1200° C. and contained a slight excess of phosphorous oxide in the reaction mixture. Yttrium phosphate batch code "B" was reacted at 1475° C. and the reaction mixture contained approximately 0.5 weight percent of excess yttrium oxide. Yttrium phosphate batch code "C" was reacted at 1200° C. and the reaction mixture contained stoichiometric amounts within the limits of the weighing error.

Plasticized extrusion batches were prepared by turbula mixing the inorganic powder batch materials for approximately 15 minutes, followed by mulling for the addition of the additives and forming aids. Two dies were used for extrusion. A rod was used for measurement of modulus of rupture and was produced with a ¼ diameter die. A one inch diameter honeycomb die was used to make cellular wares having 200 cells per square inch and 16 mil thick wall for expansion and porosity measurements. The extruded wares were dried in a humidity controlled oven for 72 hours. Samples for the three batches were then fired at three sintering temperatures, 1400, 1500, and 1600° C., for approximately 4 hours. The modulus of rupture (MOR), coefficient of thermal expansion (CTE), and porosity for each sample were determined. The results are summarized and reported in Table 4 below.

TABLE 4

Measured Physical Properties of Examples 5-13

| | Ex. # | | | | | | | | |
|---|---|---|---|---|---|---|---|---|---|
| | 5 | 6 | 7 | 8 | 9 | 10 | 11 | 12 | 13 |
| Extrusion Batch | D | D | D | E | E | E | F | F | F |
| Firing (° C.) | 1400 | 1500 | 1600 | 1400 | 1500 | 1600 | 1400 | 1500 | 1600 |
| MOR (psi) | 488 | 1036 | 2161 | 522 | 609 | 857 | 536 | 617 | 843 |
| CTE (×$10^{-7}$/° C.) | 28 | 12 | — | 18 | 15 | 5.6 | 21 | 12 | 10.5 |

TABLE 4-continued

Measured Physical Properties of Examples 5-13

| | Ex. # | | | | | | | | |
|---|---|---|---|---|---|---|---|---|---|
| | 5 | 6 | 7 | 8 | 9 | 10 | 11 | 12 | 13 |
| MPS (μm) | 7 | 10 | 1.3 | 9 | 8 | 11 | 9 | 10 | 11 |
| Porosity (%) | 56 | 46 | 18 | 54 | 41 | 41 | 56 | 49 | 41 |

Figure 7:
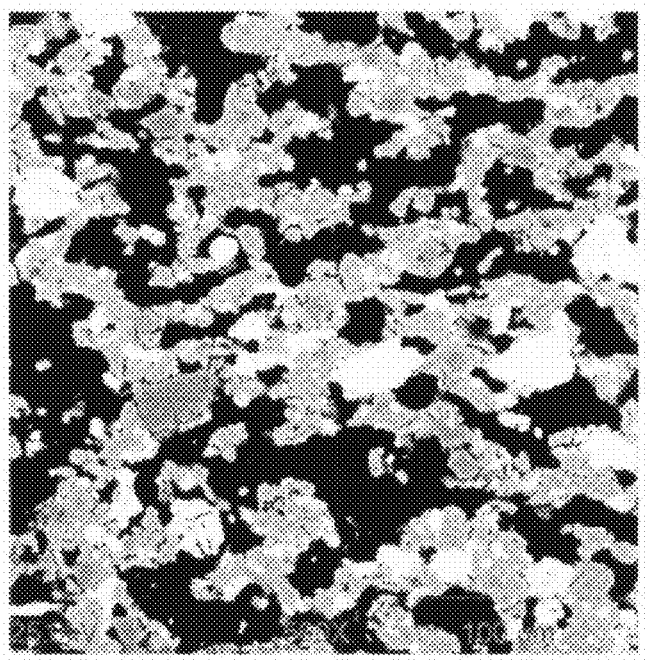
FIG. 7 is a scanning electron micrograph of an inventive ceramic composition comprising Yttrium phosphate and aluminum titanate.
Figure 8:
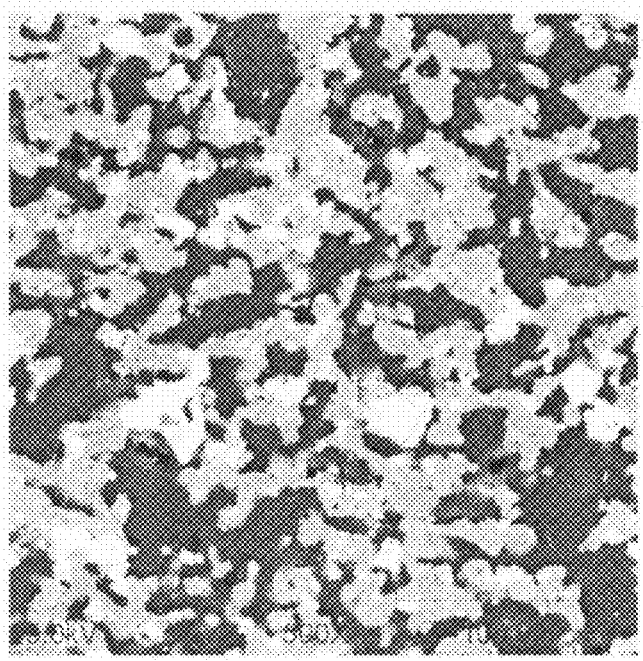
FIG. 8 is a scanning electron micrograph of an inventive ceramic composition comprising Yttrium phosphate and aluminum titante.

SEM micrographs of inventive Examples 6 and 12, are shown in FIGS. 7 and 8, respectively. As illustrated, grains with bright white contrast represent the yttrium phosphate and the gray phase represents aluminum titanate. Both the pore microstructure and the aluminum titanate phase are relatively well-connected and continuous.

Lastly, it should also be understood that while the present invention has been described in detail with respect to certain illustrative and specific embodiments thereof, it should not be considered limited to such, as numerous modifications are possible without departing from the broad spirit and scope of the present invention as defined in the claims.

What is claimed is:

1. A ceramic article, comprising a sintered phase non-silicate ceramic composition containing, as expressed on a weight percent oxide basis:

$$a(Al_2TiO_5)+b(ZrTiO_4)+c(Y_2O_3)+d(YPO_4)$$

wherein a, b, c, and d are weight fractions of each component such that (a+b+c+d)=1.00, and
wherein $0.5<a\leq0.95$; $0\leq b\leq0.5$, $0.0\leq c\leq0.10$, and $0\leq d\leq0.5$, and
wherein the total porosity of the ceramic oxide composition is at least 40%, and
wherein the sintered phase ceramic composition consists essentially of (a) aluminum titanate, zirconium titanate, and yttrium oxide, wherein $0.60\leq a\leq0.80$ and $0.20\leq b\leq0.40$ and $0.00\leq c\leq0.05$, or (b) aluminum titanate and yttrium phosphate, wherein $0.5\leq a\leq0.95$ and $0.05\leq d\leq0.5$.

2. The ceramic article of claim 1, wherein the sintered phase ceramic composition has a total porosity greater than or equal to 45%.

3. The ceramic article of claim 2, wherein the sintered phase ceramic composition has a total porosity greater than or equal to 50%.

4. The ceramic article of claim 2, wherein the sintered phase ceramic composition has a total porosity in the range of from 50% to 60%.

5. The ceramic article of claim 1, wherein the sintered phase ceramic composition has a coefficient of thermal expansion in at least one direction that is less than or equal to $15.0\times10^{-7}/°C$. across the temperature range of from 25° C. to 1000° C.

6. The ceramic article of claim 1, wherein the sintered phase ceramic composition has a coefficient of thermal expansion in at least one direction that is less than or equal to $12.0\times10^{-7}/°C$. across the temperature range of from 25° C. to 1000° C.

7. The ceramic article of claim 1, wherein the sintered phase ceramic composition has a coefficient of thermal expansion in at least one direction that is less than or equal to $10.0\times10^{-7}/°C$. across the temperature range of from 25° C. to 1000° C.

8. The ceramic article of claim 1, further comprising an alkali catalyst washcoating containing potassium, wherein the sintered phase ceramic composition has a coefficient of thermal expansion in at least one direction that is less than or equal to $20.0\times10^{-7}/°C$. across the temperature range of from 25° C. to 1000° C. after aging in steam at 850° C. for 10 hours.

9. The ceramic article of claim 1, further comprising an alkali catalyst washcoating.

10. The ceramic article of claim 9, wherein the alkali catalyst washcoating comprises potassium.

11. The ceramic article of claim 1, wherein the ceramic article is a honeycomb body.

12. A ceramic article, comprising a sintered phase ceramic composition containing, as expressed on a weight percent oxide basis:

$$a(Al_2TiO_5)+b(ZrTiO_4)+c(Y_2O_3)+d(YPO_4)$$

wherein a, b, c, and d are weight fractions of each component such that (a+b+c+d)=1.00, and
wherein $0.5\leq a\leq0.95$; $0\leq b\leq0.5$, $0.0\leq c\leq0.10$, and $0.05\leq d\leq0.5$, and
wherein the sintered phase ceramic composition consists essentially of aluminum titanate and yttrium phosphate.

13. The ceramic article of claim 12, wherein the sintered phase ceramic composition is a non-silicate ceramic oxide composition.

14. A ceramic article, comprising a sintered phase non-silicate ceramic oxide composition containing, as expressed on a weight percent oxide basis:

$$a(Al_2TiO_5)+b(ZrTiO_4)+c(Y_2O_3)+d(YPO_4)$$

wherein a, b, c, and d are weight fractions of each component such that (a+b+c+d)=1.00, and
wherein $0.5<a\leq0.95$; $0\leq b\leq0.5$, $0.0\leq c\leq0.10$, and $0\leq d\leq0.5$, and
wherein the ceramic article further comprises an alkali catalyst washcoating, wherein the washcoating comprises potassium.

15. A ceramic article, comprising:
an alkali catalyst washcoating; and
a sintered phase non-silicate ceramic composition containing, as expressed on a weight percent oxide basis:

$$a(Al_2TiO_5)+b(ZrTiO_4)+c(Y_2O_3)+d(YPO_4)$$

wherein a, b, c, and d are weight fractions of each component such that (a+b+c+d)=1.00, and
wherein $0.5<a\leq0.95$; $0\leq b\leq0.5$, $0.0\leq c\leq0.10$, and $0\leq d\leq0.5$, and
wherein the total porosity of the ceramic oxide composition is at least 40%.

* * * * *